(12) United States Patent
Rajpathak et al.

(10) Patent No.: US 10,109,115 B2
(45) Date of Patent: Oct. 23, 2018

(54) MODIFYING VEHICLE FAULT DIAGNOSIS BASED ON STATISTICAL ANALYSIS OF PAST SERVICE INQUIRIES

(71) Applicant: GM Global Technology Operations LLC, Detroit, MI (US)

(72) Inventors: Dnyanesh Rajpathak, Karnataka (IN); Prakash Mohan Peranandam, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 711 days.

(21) Appl. No.: 14/644,662

(22) Filed: Mar. 11, 2015

(65) Prior Publication Data
US 2016/0267723 A1 Sep. 15, 2016

(51) Int. Cl.
G06F 17/30 (2006.01)
G07C 5/00 (2006.01)
G07C 5/08 (2006.01)

(52) U.S. Cl.
CPC ......... *G07C 5/008* (2013.01); *G06F 17/3071* (2013.01); *G06F 17/30713* (2013.01); *G07C 5/0808* (2013.01)

(58) Field of Classification Search
CPC ............ G06F 17/3071; G06F 17/30713
See application file for complete search history.

(56) References Cited

U.S. PATENT DOCUMENTS

| 9,672,497 | B1 * | 6/2017 | Lewis | G06Q 10/20 |
| 2012/0011073 | A1 * | 1/2012 | Rajpathak | G06F 17/3071 705/305 |

* cited by examiner

*Primary Examiner* — Kris E Mackes
(74) *Attorney, Agent, or Firm* — Reising Ethington P.C.

(57) ABSTRACT

A system and method of modifying a vehicle service database includes: accessing a database containing previously-received symptom text that has been associated with a vehicle identifier and one or more vehicular service solutions for the previously-received symptom text; determining a statistical likelihood that one or more additional vehicular service solutions apply to previously-received symptom text based on a correlation between the previously-received symptom text and additional vehicular service solutions; determining that the statistical likelihood is above a predetermined threshold; and associating the previously-received symptom text with the additional vehicular service solutions.

15 Claims, 7 Drawing Sheets

MODIFYING VEHICLE FAULT DIAGNOSIS BASED ON STATISTICAL ANALYSIS OF PAST SERVICE INQUIRIES

TECHNICAL FIELD

The present invention relates to vehicle diagnostic tools and, more particularly, to identifying vehicular service solutions based on past vehicle service inquiries.

BACKGROUND

Occasionally, vehicle owners may experience a problem with their vehicles and when they do the owners can seek help from a service technician who specializes in resolving those problems. As part of diagnosing the cause of a problem, the technician may access a database that links identifiable problems with their likely solutions. For example, the technician may obtain a diagnostic trouble code (DTC) from the vehicle, provide the observed DTC to the database, and receive one or more possible solutions to problems represented by the DTC that include additional DTCs from the past along with text-based representations of vehicle problems and the best practice repairs. However, sometimes the DTC generated by the vehicle can be remedied by solutions other than those associated with the DTC. In that case, the technician may not fully solve the underlying problem resulting in additional visits to the technician before the problem is solved. It would be helpful to augment the DTC-solution correlation of the database with statistical analysis of past text input, solutions provided, and outcomes of the solutions to recursively modify the solutions provided to technicians.

SUMMARY

According to an embodiment of the invention, there is provided a method of modifying a vehicle service database. The method includes accessing a database containing previously-received symptom text that has been associated with a vehicle identifier and one or more vehicular service solutions for the previously-received symptom text; determining a statistical likelihood that one or more additional vehicular service solutions apply to previously-received symptom text based on a correlation between the previously-received symptom text and additional vehicular service solutions; determining that the statistical likelihood is above a predetermined threshold; and associating the previously-received symptom text with the additional vehicular service solutions.

According to another embodiment of the invention, there is provided a method of modifying a vehicle service database. The method includes accessing a database containing previously-received symptom text and a DTC that have been associated with one or more vehicular service solutions for vehicles having the same vehicle identifier in a database; determining a statistical likelihood that one or more additional vehicular service solutions apply to the previously-received symptom text and DTC based on a correlation between words in the previously-received symptom text; determining that the statistical likelihood is above a predetermined threshold; and associating the symptom text with the additional vehicular service solutions.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below modifies a vehicle service database accessed as part of diagnosing vehicle problems. When a vehicle service technician inspects a suspected vehicle problem, the technician can use a computer terminal, such as a personal computer or a vehicle scan tool, to obtain diagnostic trouble codes (DTCs) from the vehicle, observe the vehicle problem, and describe the problem in text form. The vehicle technician can then input the DTC(s), the text, or both into the computer terminal, provide what is input to the vehicle service database, and receive in return one or more possible solutions to the vehicle problem. In this model, the vehicle service database identifies the DTC or words in the text that it receives and then uses clustering algorithms to cluster the DTC/words with DTCs/words in the database that are associated with vehicular service solutions for solving the problem. When the clusters are generated for an observed DTC in vehicle, the vehicle service database can provide the vehicular service solutions to the service technician. Furthermore, the algorithm may also verify that the solutions provided to the technicians in the past are not regenerated during a return or repeat visit to ensure the quality of proposes solutions.

The vehicle service database containing previously-received symptom text (and optionally DTCs) associated with one or more vehicle service solutions can be optimized by statistically analyzing correlations between words in a first portion of the previously-received symptom text with another portion of the previously-received symptom text. If a correlation is found, additional vehicle service solutions associated with another portion of the previously-received symptom text can then also be associated with the first portion of previously-received symptom text. Then, when a vehicle service technician inputs symptom text to the vehicle service database, both the existing vehicle service solutions as well as the additional vehicle service solutions can be provided to the technician for solving the vehicle trouble. The additional vehicle service solutions can increase the probability that the service technician will resolve the vehicle problem during an initial customer visit.

Figure 1:
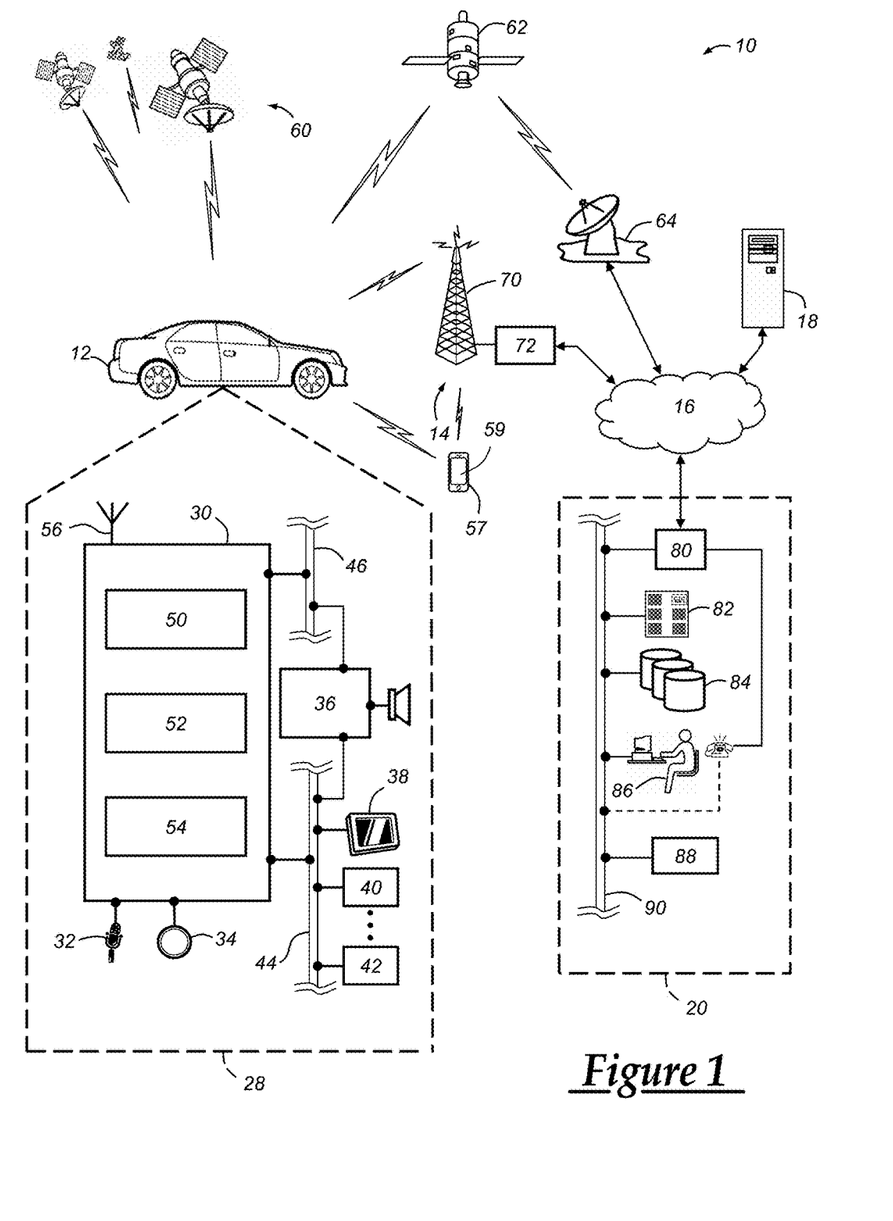
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a separate wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. as well as others. These and other similar devices may be used or considered as a type of handheld wireless device for the purposes of the method described herein. While the smart phone 57 is described with the methods below, it should be appreciated that other similar and/or simpler handheld wireless device can be successfully substituted for the smart phone 57 to carry out the method/system described herein. For instance, devices such as the iPad™ or iPod Touch™ can also use the short-range wireless protocols to communicate despite not having the capability to communicate via cellular protocols.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
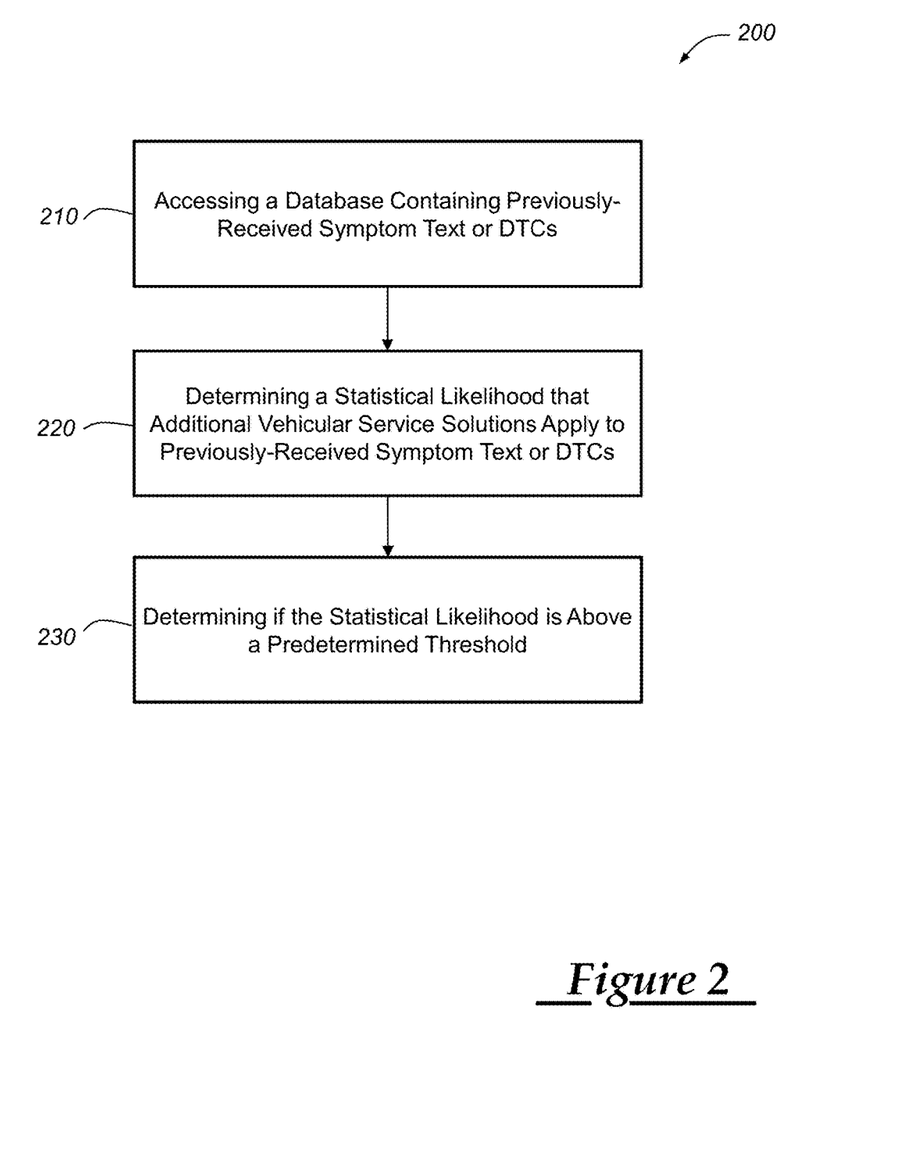
FIG. 2 is a flow chart of an exemplary method of modifying a vehicle service database.

Turning now to FIG. 2, a method (200) of modifying a vehicle service database is shown. The method 200 begins at step 210 by accessing a database containing previously-received symptom text and DTCs that have been associated with one or more vehicular service solutions for vehicles having the same vehicle identifier in a database. The vehicle service database can be implemented in one of a variety of centrally-located facilities, such as the computer 18 or call center 20 discussed above with respect to FIG. 1. While the vehicle service database is discussed herein as a single entity, it should be appreciated that the database could comprise a plurality of independent databases that each maintain previously-received symptom text and DTCs associated with vehicle service solutions.

The vehicle service database can be accessed using a diagnostic template that can be presented to a vehicle service technician where the vehicle 12 is located. This can be accomplished via a number of devices, such as a personal computer (PC) (not shown), a vehicle scan tool (not shown), or a mobile application used on a handheld wireless device (e.g., smart phone 57), which are known to those skilled in the art. The vehicle service technician can observe the problem experienced by a vehicle owner and describe the problem in words that can comprise the symptom text. The vehicle service technician can also obtain one or more DTCs from the vehicle 12 using the PC, the vehicle scan tool, or the smart phone 57. The symptom text, the DTCs, or both can be transmitted to the vehicle service database where they may be compared with previously-received symptom text/DTCs and the vehicle service solutions associated with the previously-received symptom text/DTCs. Clustering algorithms can be developed to cluster the symptom text and DTCs simultaneously and identify previously-received additional text symptoms or DTCs, which may co-occur with the text symptoms/DTCs associated with the vehicle 12 receiving service. When a match between the received symptom text and the previously-received symptom text is found or a match between received DTCs and previously-received DTCs is found, the vehicle service solutions associated with the previously-received symptom text/DTCs can be sent to the vehicle service technician.

The symptom text and/or DTCs the vehicle service technician sent to the vehicle service database can be followed up with the vehicle service solution used to ultimately resolve the problem. The symptom text and/or the DTCs can be linked with the vehicle service solution and stored in the vehicle service database along with a vehicle identifier that can be used to identify and/or categorize the data. Vehicle identifiers can include general information regarding the vehicle 12, such as a manufacturer, a brand/model, a model year, or trim level of the vehicle. Or the vehicle identifiers can include more specific information, such as a vehicle identification number (VIN) that particularly identifies the vehicle 12 and its equipment. Beyond vehicle identifiers, the symptom text, DTCs, and vehicle service solutions can also be identified by vehicle mileage and age of the vehicle 12 recorded at the time the service occurred. The method 200 proceeds to step 220.

At step 220, a statistical likelihood is determined that one or more additional vehicular service solutions apply to the previously-received symptom text and/or DTC(s) based on a correlation between words in the previously-received symptom text. Once the vehicle service database has acquired a significant amount of data representing symptom text, DTCs, and vehicle service solutions from a fleet of vehicles, that data can be analyzed to identify relationships between symptom text and/or DTCs and additional vehicular service solutions that may not be identified as a possible solution to a particular string of symptom text.

Vehicles can be classified according to mileage ranges (e.g., 0-5,000 miles, 5,000-10,000 miles, etc.) and also according to their age to further refine the data. For example, additional vehicle service solutions can be identified for vehicles represented by a particular vehicle identifier having between 5,000-10,000 miles. In one implementation, the data included in the vehicle service database can be refined based on a DTC. For instance, one or more DTCs can be identified and clustered along with the symptom text associated with each DTC. The two clusters including symptom text (one for each DTC) can be merged. If more than two clusters are used, then clusters can begin to be merged starting with clusters having the largest statistical distance between symptom text associated with DTCs from two clusters and ending when only one cluster remains. This process can establish all of the likely correlations that may occur between DTCs, symptom text, and the vehicular service solutions for the DTCs/symptom text.

Symptom text for each DTC cluster can then be analyzed to identify correlations with additional DTCs or additional symptom text. One example of symptom text could read: DETERMINED THAT THE VEHICLE HAS TO BE JUMP STARTED. SO INSP FOUND THE BATTERY IS LEAKING ACID. REPLACED THE BATTERY AND CLEANED THE POSITIVE BATTERY CABLE. THE BATTERY PART #89022223. Software can access the database and remove extraneous words (e.g. stop words) from the symptom text such that the symptom text then reads: VEHICLE JUMP STARTED. INSP FOUND BATTERY LEAKING ACID. REPLACED BATTERY AND CLEANED POSITIVE BATTERY CABLE. BATTERY PART #89022223.

The revised symptom text can then be parsed to identify vehicle elements (i.e., vehicle, battery, positive battery cable), symptoms of trouble (i.e., jump started, leaking acid, and dead battery), and vehicular service solutions (i.e., replace and clean). The vehicle service database can then associate the vehicle elements, symptoms of trouble, and the vehicular service solution with a vehicle identifier. Apart from that association, the vehicle elements, symptoms of trouble, or vehicular service solutions can be isolated and used to determine how statistically likely they are to appear with other DTCs than what they are currently associated with. When statistically significant relationships between symptom text and additional DTCs or additional symptom text, these relationships can be used for the diagnostic template. Additional vehicular service solutions and/or DTCs can be associated with symptom text. As symptom text is added to the vehicle service database, relationships between vehicle elements, symptoms of trouble, and vehicular service solutions can emerge based on the statistical likelihood that the vehicle elements, symptoms of trouble, and the vehicular service solution are correlated. Using these correlations, the vehicular service solutions provided to a service technician via the diagnostic template for particular symptom text can be as helpful as it can be. The method 200 proceeds to step 230.

At step 230, it is determined whether the statistical likelihood is above a predetermined threshold and, if so, the symptom text is associated with the additional vehicular service solutions. The statistical likelihood of a symptom text being associated with additional vehicular service solution can be calculated by using a measure called Term Frequency-Inverse Document Frequency (TF-IDF). The calculations can be implemented using the following relationships. $Tf_{i,j}=(n_{i,j})/(\Sigma_k n_{k,j})$ where $Tf_{i,j}$ is the symptom text frequency, $n_{i,j}$ indicates the number of occurrences of words that appear in symptom text $T_j$ and the denominator is the sum of the number of occurrences of all text symptoms in $T_j$. $idf_i=log|V|/|\{v: \text{text symptom}_i \epsilon v\}|$ where, $idf_i$ measures a general importance of a word in the symptom text, $|V|$ total number of symptom texts, and $\{v: \text{text symptom}_i \epsilon v\}$ is the number of text symptoms in which the word occurs. Based on these relationships, $(Tf-idf)_{i,j}=Tf_{i,j}*idf_i$, which is a numerical statistic that reflects how important symptom text is to a vehicle service solution in a collection of relevant vehicle service solutions retrieved from the past cases. Furthermore, additional statistical evidence can be employed in the form of Association Rules Mining that allows us to determine most frequently co-occurring symptom text and DTC cases extracted from the vehicle database.

Once a relationship between symptom text, DTCs, and/or previously-identified symptom text is identified, it is determined whether the relationship is statistically significant such that additional service solutions should be added to existing service solutions associated with vehicle elements, symptoms of trouble, or both. If such a relationship is statistically significant, the diagnostic template is updated with the newly-found association. The statistically significant solutions developed by the method 200 can also be compared with service information documents to see whether such solution is already present in the service information document. The service information documents are trusted resources used by service technicians while doing fault diagnosis and root cause investigation. The semantic similarity between new symptom text and symptom text from the service information document(s) can be compared automatically by using: a semantic distance between symptoms from past cases and service information document $Sy_a$ and $Sy_b$: $dis(Sy_a, Sy_b)$; a max 'PMI' between any symptoms, $Sy_b$ and service information document T: $maxdis(T, Sy_b)$; and an inverse document frequency of service document T: $idf(T)$. This relationship is shown below:

$$sim(Sy_a, Sy_b) = \frac{1}{2}\left(\frac{\sum_{T\in\{Sy_a\}}(maxdis(T, Sy_b)*idf(T))}{\sum_{T\in\{Sy_a\}} idf(T)} + \frac{\sum_{T\in\{Sy_b\}}(maxdis(T, Sy_a)*idf(T))}{\sum_{T\in\{Sy_b\}} idf(T)}\right)$$

If a semantic similarity ($Sy_a$, $Sy_b$) between new symptom text when calculated with the relevant information from the service information documents is below specific threshold then such a similarity is not determined to exist. The method 200 then ends.

Figure 3:
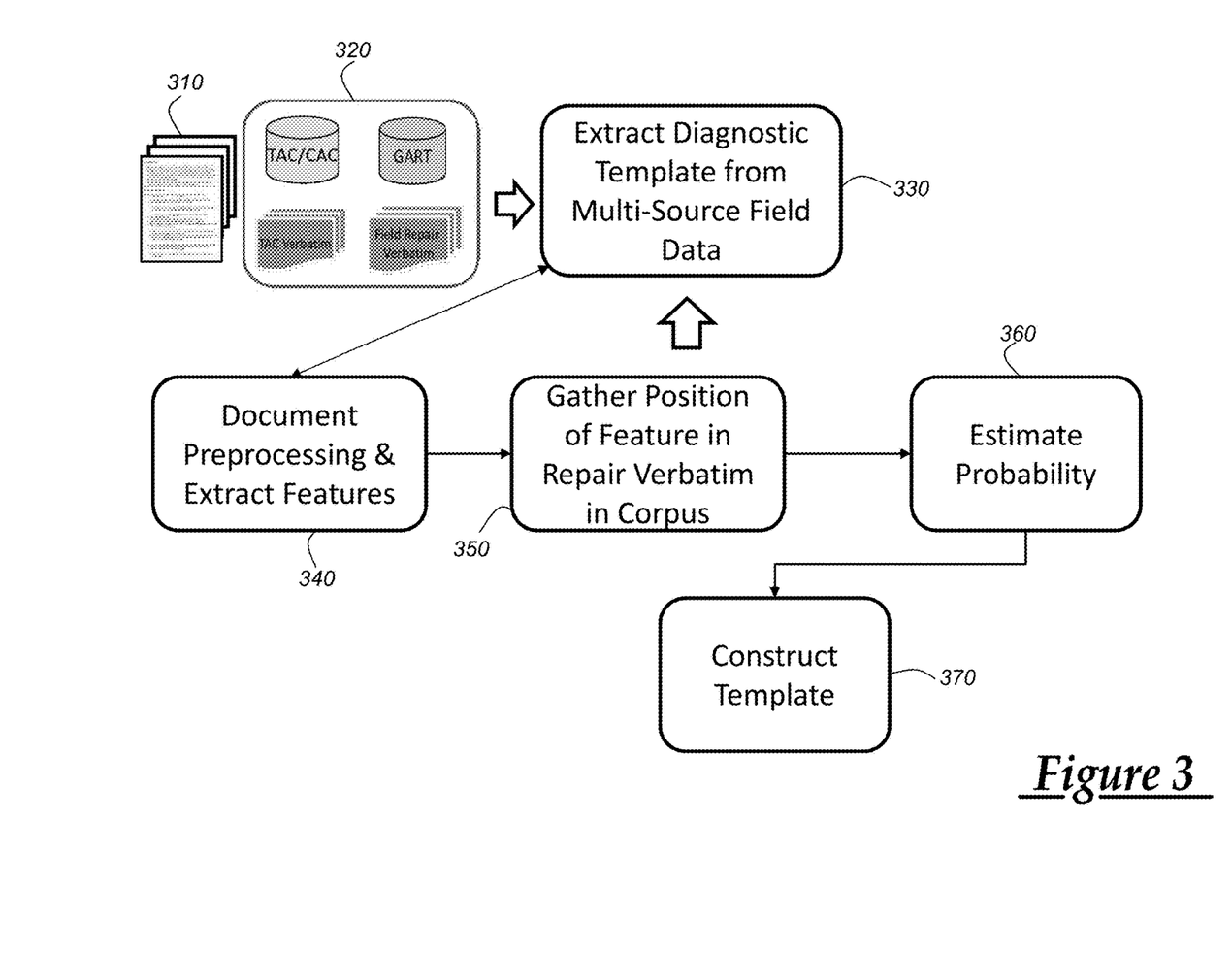
FIG. 3 is a block diagram of one aspect of an exemplary method of modifying a vehicle service database.

Turning now to FIG. 3, another implementation of a method (300) of modifying a vehicle service database is shown. The method 300 begins at step 310 by receiving text documents from a service technician that describes vehicle symptoms, solutions carried out to remedy those symptoms, and the vehicle parts used. This text can be received and stored in a variety of different databases that track vehicle repairs at step 320. After receiving a significant amount of text, it is possible at step 330 to analyze the text to identify relationships between words included in the text that may not have been previously identified. At step 340, the text can be processed to extract words or features. The position of the words/features in each sentence can be identified at step 350, the probability that word/features are related to each other is calculated (step 360), and a new diagnostic template can be created at step 370. These steps are shown in more detail in FIGS. 4-7.

Figure 4:
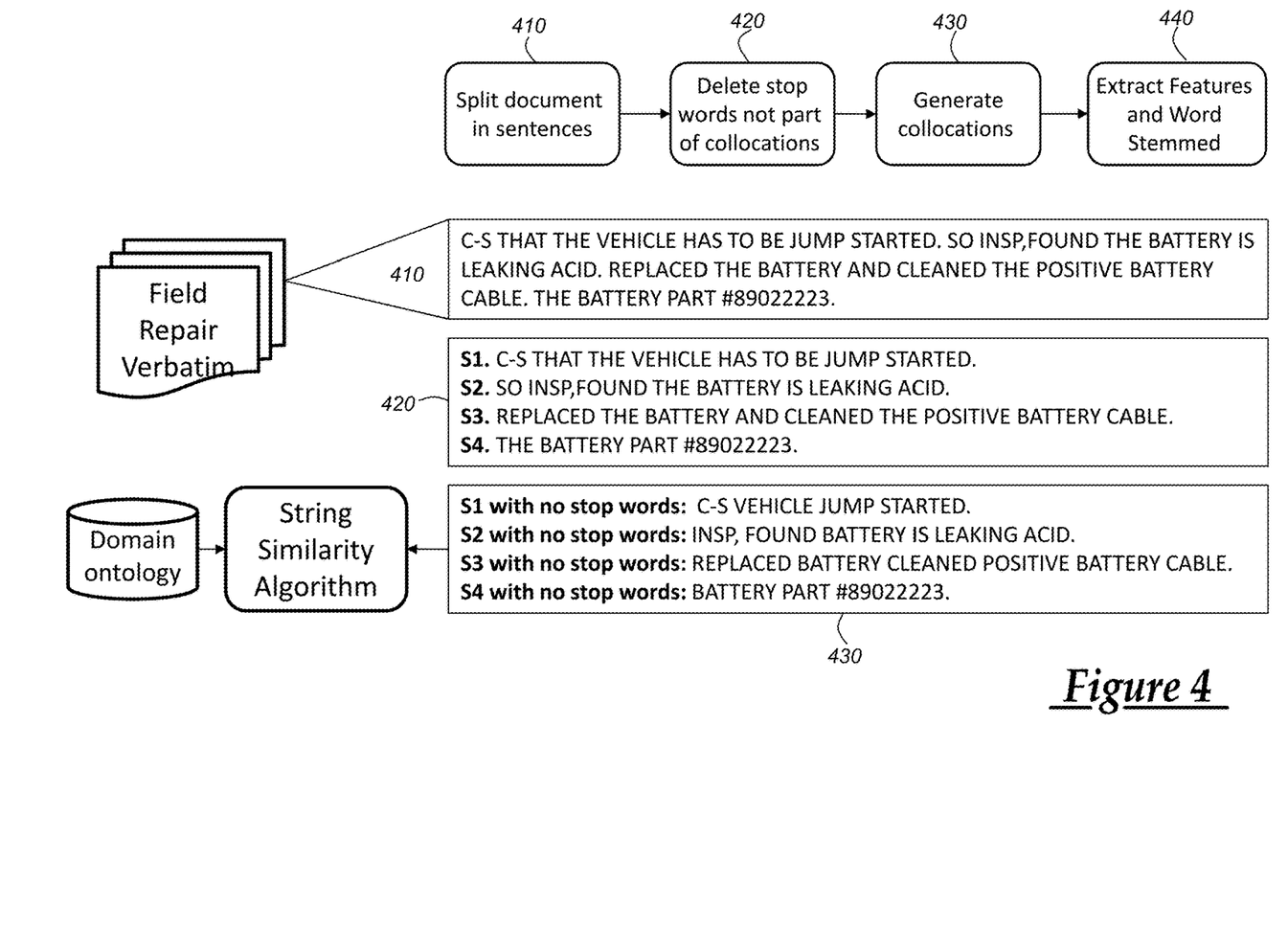
FIG. 4 is a block diagram of another aspect of an exemplary method of modifying a vehicle service database.

In FIG. 4, a text document can be split into sentences at step 410. The sentences can then be processed to remove any "stop words," such as articles and prepositions at step 420. After removing stop words, the remaining words in the sentence can be collected together at step 430. As can be appreciated in FIG. 4, the created sentence "C-S that the vehicle has to be jump started" can be processed to remove stop words like "that," "the," and "has to be"

Figure 5:
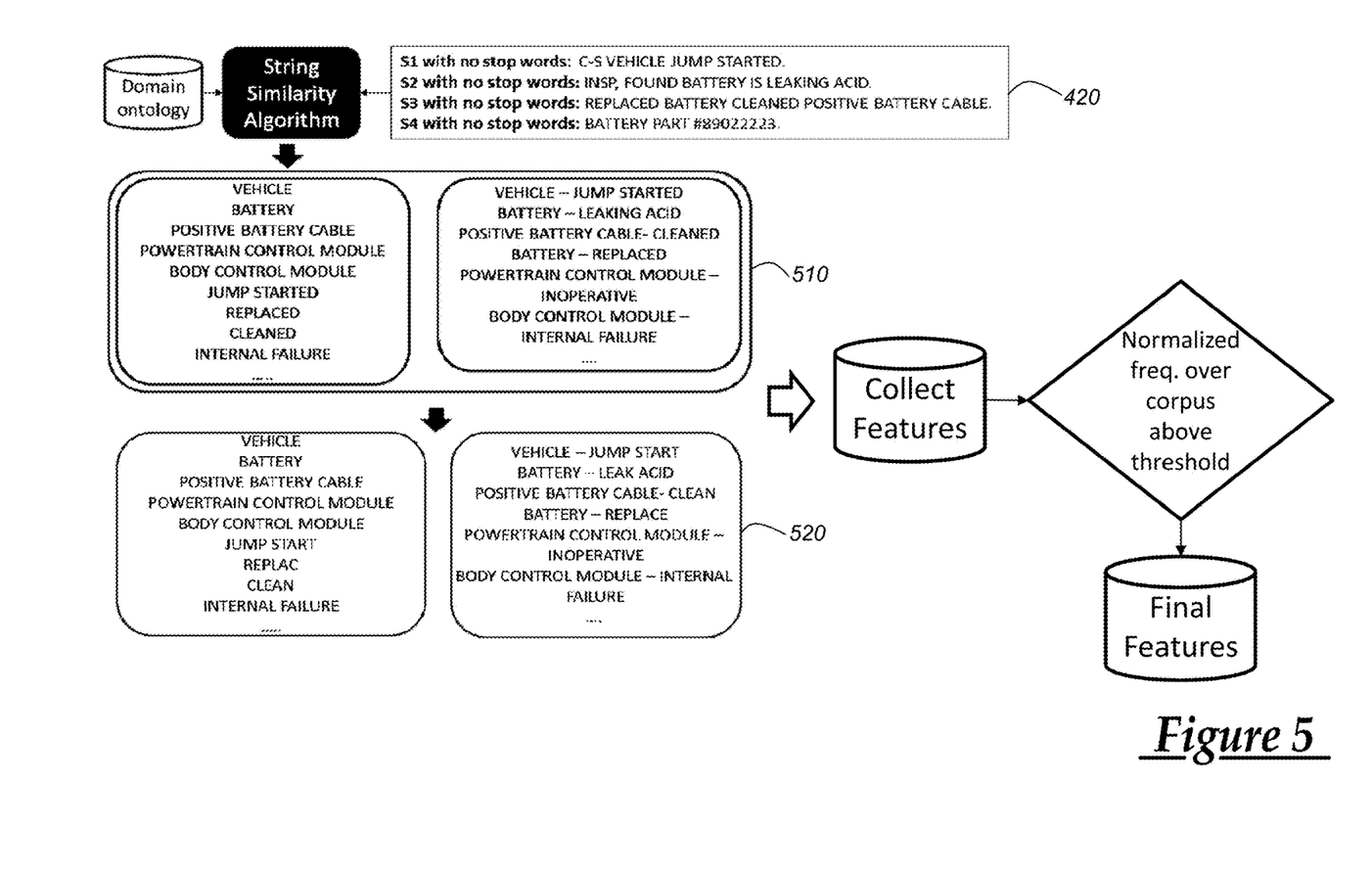
FIG. 5 is a block diagram of another aspect of an exemplary method of modifying a vehicle service database.
Figure 6:
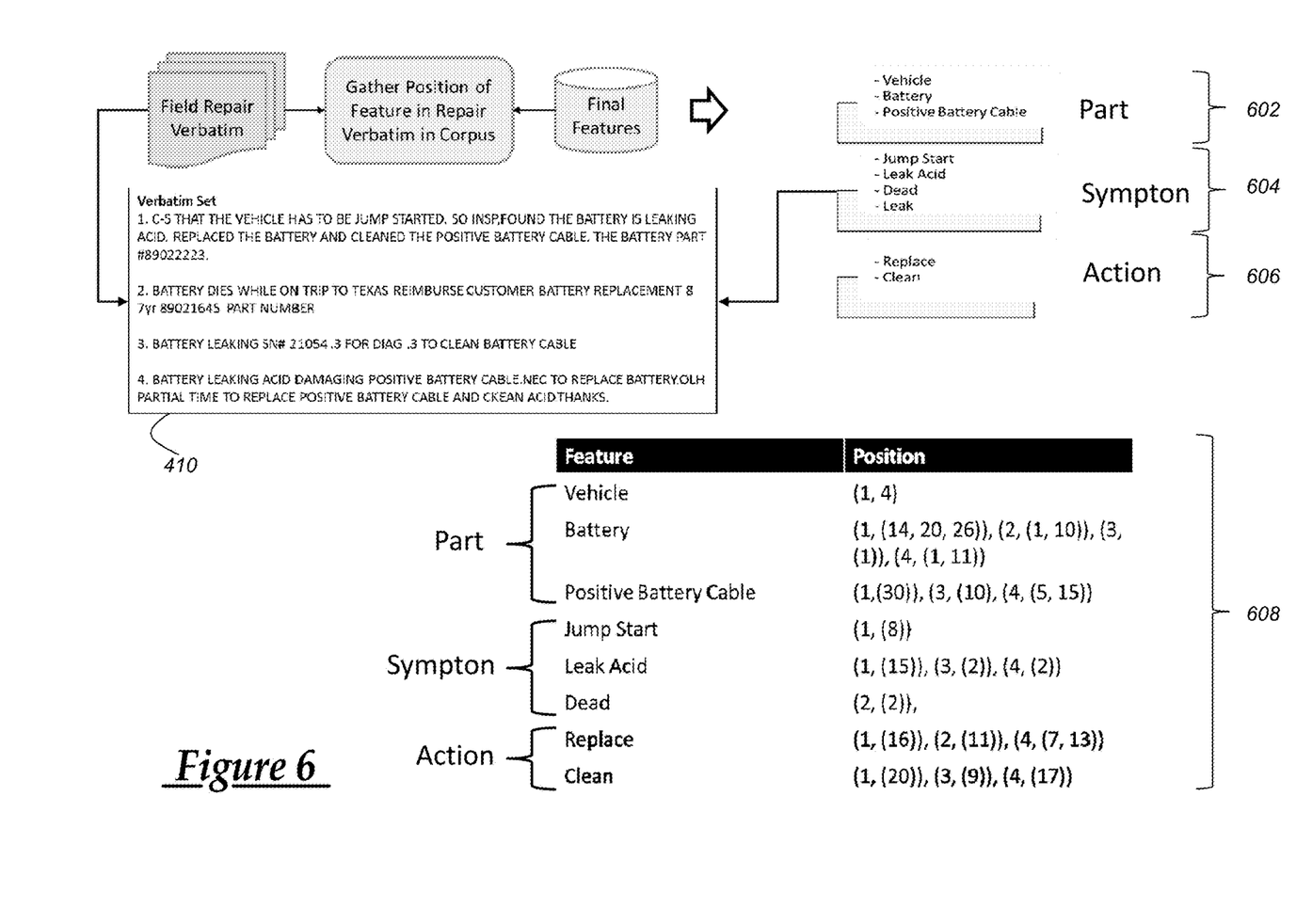
FIG. 6 is a block diagram of another aspect of an exemplary method of modifying a vehicle service database.

The collection of words or vehicle terms after the removal of stop words is shown in FIG. 5. There the words that remain from step 430 can be associated with each other. For example, vehicle parts such as "vehicle," "battery," "positive battery cable" can be found to be associated with service solutions like "jump started," "leaking acid," and "cleaned," respectively, at step 510. The words can also be normalized to remove extra verbiage at step 520. Words like "jump started" can be shortened to "jump start." Or words like "leaking" can be shortened to "leak." While this is being described in terms of a cluster of vehicle parts and vehicle solutions, other clusters can be created as well. Then associations between clusters can be identified. For example, other clusters could include vehicle parts and vehicle symptoms or vehicle symptoms and vehicle solutions. The separation of words from sentences and normalization is also shown in FIG. 6. There, each word can be classified as a vehicle part (602), a vehicle symptom (604), or a solution (606). In addition to classifying each word as a part, a symptom, or a solution, the location of each word in its sentence can be determined at 608. For example, the word "vehicle" can be determined to be in the first sentence and the fourth word in that sentence. The word "battery" can be the 14th, 20th, and 26th words in the first sentence, the 1st and 10th words in the second sentence, the 1st word in the third sentence, and the 1st and 11th word in the fourth sentence. This process can be carried out for all of the part words, the symptom words, and the solution or action words. Once the associated words have been normalized, relationships between these words can be determined.

Figure 7:
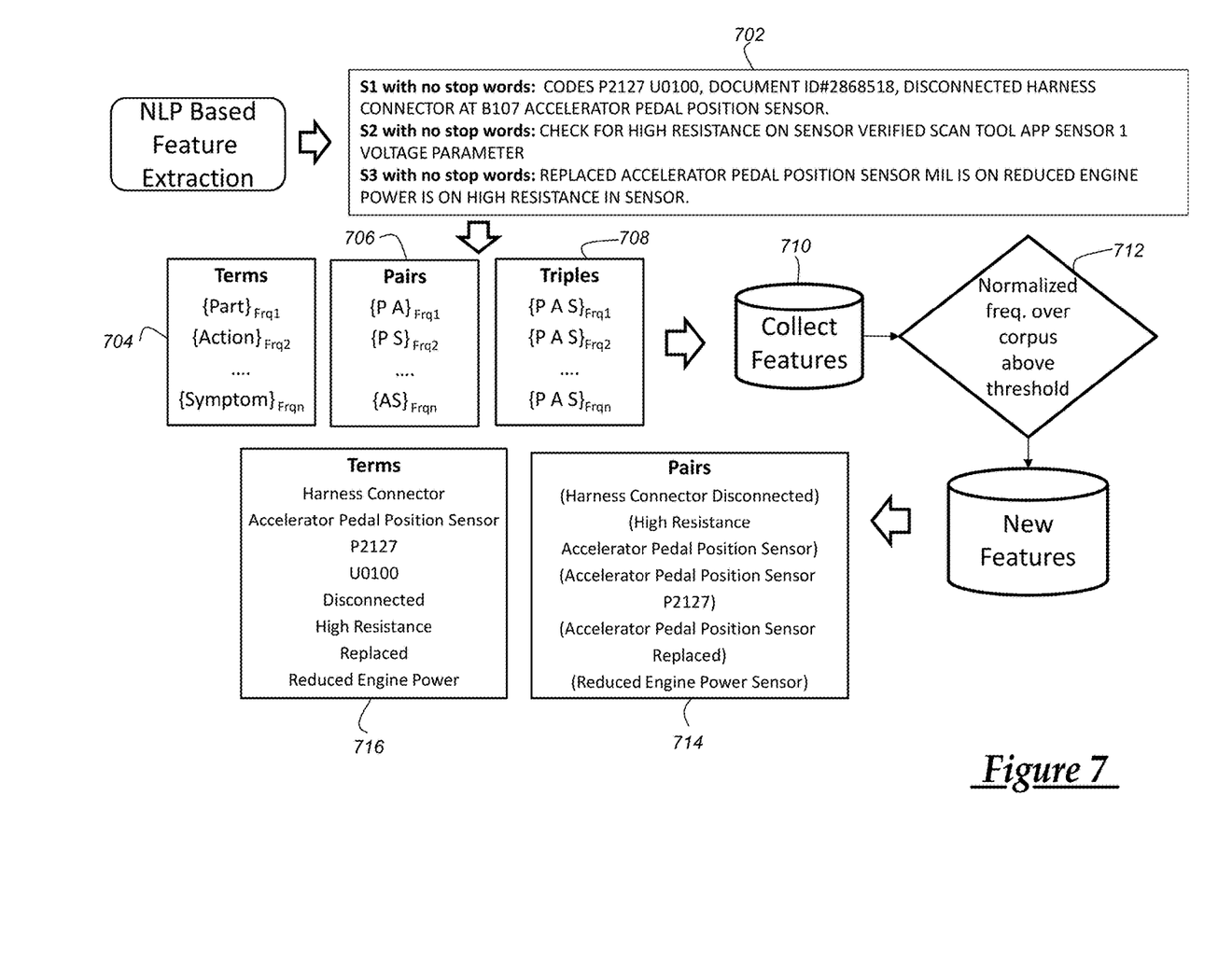
FIG. 7 is a block diagram of another aspect of an exemplary method of modifying a vehicle service database.

In FIG. 7, an example is shown how sentences can be separated into clusters of words. This can also be referred to as natural language processing (NLP) feature extraction. After sentences have been removed of stop words (step 702), the words can be analyzed to determine how frequently those words appear. For instance, at step 704 each word can be classified as a part, an action, or a symptom and also how frequently each of those words appear. Then, at step 706 the words can be gathered into clusters according to how many times the words appear in pairs. And the words can also be gathered into clusters having three words at step 708. The clusters having three words can be analyzed to determine the frequency with which the three words occur. After creating these clusters, all of the created clusters can be gathered at step 710 and normalized at step 712 as was described above. New associations can then be made. In this example, at step 714, it can be determined that the word or term "harness connector" and "disconnected" occur with a frequency that is above a predetermined threshold. Similarly, the words "high resistance" and "accelerator pedal position sensor" may occur frequently as well. From these word pairings, a group of associated terms can be found at step 716.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of modifying a vehicle service database, wherein the method is carried out by one or more servers at a centrally-located facility, wherein the centrally-located facility includes a plurality of vehicle service databases that are accessible by the one or more servers, the method comprising the steps of:
  (a) accessing a first one of the plurality of databases containing previously-received symptom text that has been associated with a vehicle identifier and one or more vehicular service solutions for the previously-received symptom text, wherein a first portion of the previously-received symptom text is associated with the one or more vehicular service solutions;
  (b) determining a likelihood that one or more additional vehicular service solutions apply to previously-received symptom text based on a correlation between the previously-received symptom text and the one or more additional vehicular service solutions, wherein the one or more additional vehicular service solutions are associated with other symptom text in the first database, wherein the other symptom text includes symptoms and/or parts that are different than those included in the first portion of the previously-received symptom text, and wherein the correlation between the previously-received symptom text and the one or more additional vehicular service solutions is based on a correlation between a second portion of the previously-received symptom text and at least some of the other symptom text in the first database;
  (c) determining that the likelihood is above a predetermined threshold;
  (d) associating the previously-received symptom text with the additional vehicular service solutions;
  (e) receiving a request that includes symptom text that corresponds to the previously-received symptom text; and
  (f) sending the additional service solutions to a vehicle service facility via a land network and/or a cellular carrier system in response to receiving the request that includes the symptom text that corresponds to the previously-received symptom text, wherein the additional service solutions are used to address symptoms of a vehicle that are included in the symptom text.

2. The method of claim 1, further comprising the step of separating the previously-received symptom text into sentences; and
removing stop words from the sentences.

3. The method of claim 2, further comprising the step of classifying words in the sentences as a vehicle element, a vehicle symptom, or a vehicle service solution.

4. The method of claim 1, wherein the previously-received symptom text further comprises a vehicle element, a vehicle symptom, or a vehicular service solution.

5. The method of claim 1, wherein the vehicle identifier further comprises a manufacturer, a model, a model year, or trim level of a vehicle.

6. The method of claim 1, wherein the vehicle identifier further comprises a vehicle identification number (VIN).

7. The method of claim 1, further comprising the step of associating previously-received symptom text or vehicle service solutions with a vehicle mileage range.

8. The method of claim 1, further comprising the step of providing the additional vehicular service solutions to a vehicle service technician via a diagnostic template.

9. A method of modifying a vehicle service database, wherein the method is carried out by one or more servers at a centrally-located facility, wherein the centrally-located facility includes a plurality of vehicle service databases that are accessible by the one or more servers, the method comprising the steps of:
- (a) accessing a first one of the plurality of databases containing previously-received symptom text and a DTC that have been associated with one or more vehicular service solutions for vehicles having the same vehicle identifier in the first database;
- (b) determining a likelihood that one or more additional vehicular service solutions apply to the previously-received symptom text and DTC based on a correlation between words in the previously-received symptom text, wherein the determination includes:
  - (b1) clustering words or DTCs of a plurality of symptom text into clusters based on the words and/or the DTCs; and
  - (b2) analyzing associations between the clusters based at least partly on frequency or proximity of words or DTCs within a first cluster to words or DTCs of a second cluster, wherein the previously-received symptom text is included in the first cluster, wherein the one or more additional vehicular service solutions are associated with other symptom text contained in the second cluster, and wherein the correlation between the words in the previously-received symptom text is based at least partly on the associations of the first cluster and the second cluster;
- (c) determining that the likelihood is above a predetermined threshold; and
- (d) associating the symptom text with the additional vehicular service solutions.

10. The method of claim 9, wherein the previously-received symptom text further comprises a vehicle element, a symptom of trouble, or a vehicular service solution.

11. The method of claim 9, further comprising the step of separating the previously-received symptom text into sentences; and
removing stop words from the sentences.

12. The method of claim 9, wherein the vehicle identifier further comprises a manufacturer, a model, a model year, or trim level of a vehicle.

13. The method of claim 9, wherein the vehicle identifier further comprises a vehicle identification number (VIN).

14. The method of claim 9, further comprising the step of associating previously-received symptom text or vehicle service solutions with a vehicle mileage range.

15. The method of claim 9, further comprising the step of providing the additional vehicular service solutions to a vehicle service technician via a diagnostic template.

* * * * *